(12) United States Patent
Mochizuki

(10) Patent No.: US 8,245,305 B2
(45) Date of Patent: Aug. 14, 2012

(54) FILE PROCESSOR, METHOD OF PROCESSING FILES, AND PROGRAM FOR PROCESSING FILES

(75) Inventor: Takatoshi Mochizuki, Kobe (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1055 days.

(21) Appl. No.: 11/486,059

(22) Filed: Jul. 14, 2006

(65) Prior Publication Data
US 2007/0050398 A1 Mar. 1, 2007

(30) Foreign Application Priority Data
Aug. 30, 2005 (JP) .................................. 2005-249316

(51) Int. Cl.
*G06F 17/00* (2006.01)
(52) U.S. Cl. ............. 726/26; 726/27; 707/609; 707/694
(58) Field of Classification Search ........................ None
See application file for complete search history.

(56) References Cited

U.S. PATENT DOCUMENTS

| 4,903,229 | A | * | 2/1990 | Schmidt et al. ............... 707/200 |
|---|---|---|---|---|
| 4,996,662 | A | * | 2/1991 | Cooper et al. .................... 707/1 |
| 5,050,071 | A | * | 9/1991 | Harris et al. ...................... 707/1 |
| 5,107,423 | A | * | 4/1992 | Sasaki et al. ................... 715/255 |
| 5,778,365 | A |   | 7/1998 | Nishiyama |
| 5,983,241 | A |   | 11/1999 | Hoshino |
| 6,006,242 | A | * | 12/1999 | Poole et al. .................... 715/209 |
| 6,016,491 | A | * | 1/2000 | Kou .................................. 707/9 |
| 6,466,968 | B2 |   | 10/2002 | Shirai et al. |
| 6,760,840 | B1 |   | 7/2004 | Shimbo et al. |
| 6,782,402 | B1 |   | 8/2004 | Hidaka et al. |
| 6,931,592 | B1 | * | 8/2005 | Ramaley et al. ............... 715/209 |
| 7,490,116 | B2 | * | 2/2009 | Carson et al. .................. 707/205 |
| 7,546,629 | B2 | * | 6/2009 | Albert et al. ....................... 726/1 |
| 7,774,322 | B2 | * | 8/2010 | Davis et al. .................... 707/691 |
| 7,937,326 | B1 | * | 5/2011 | Thaxton .......................... 705/57 |
| 2001/0056545 | A1 | * | 12/2001 | Takechi et al. ................ 713/200 |
| 2002/0186258 | A1 |   | 12/2002 | Shibata |
| 2004/0088281 | A1 | * | 5/2004 | Matsuishi .......................... 707/2 |

(Continued)

FOREIGN PATENT DOCUMENTS
JP 6-290214 10/1994
(Continued)

OTHER PUBLICATIONS

David J. Kappos, "Subject Matter Eligibility of Computer Readable Media", Jan. 26, 2010, 1 page.*

(Continued)

*Primary Examiner* — Ponnoreay Pich
(74) *Attorney, Agent, or Firm* — Buchanan Ingersoll & Rooney PC

(57) ABSTRACT

A file processor which couples a plurality of files to create one coupled file including: a file selector that designates a plurality of files to be coupled; a security setting information extracting part that extracts security setting information which includes a setting item which is relevant to security being set to each of the files to be coupled; a coupled file creating part that couples the plurality of files to be coupled to create newly one coupled file; and, a security setup part that creates new security setting information based on the extracted security setting information and add new security setting to the coupled file.

15 Claims, 14 Drawing Sheets

U.S. PATENT DOCUMENTS

| | | | | |
|---|---|---|---|---|
| 2004/0205589 A1* | 10/2004 | Yoshioka | | 715/513 |
| 2005/0086196 A1* | 4/2005 | Peterson | | 707/1 |
| 2006/0020809 A1 | 1/2006 | Hayashi | | |
| 2006/0101028 A1* | 5/2006 | Banks et al. | | 707/100 |
| 2006/0288421 A1* | 12/2006 | Tsai et al. | | 726/26 |

FOREIGN PATENT DOCUMENTS

| | | |
|---|---|---|
| JP | 2002-006840 | 1/2002 |
| JP | 2002-19198 | 1/2002 |
| JP | 2002-157155 | 5/2002 |
| JP | 2002-259182 | 9/2002 |
| JP | 2003-189088 | 7/2003 |
| JP | 2004-021411 | 1/2004 |

OTHER PUBLICATIONS

Notification of Reason(s) for Refusal in JP 2005-249316 dated Jul. 29, 2008, and English Translation thereof.

* cited by examiner

| SECURITY | File1 | File2 | File3 |
|---|---|---|---|
| TYPING IN PASSWORDS WHEN OPENING A FILE | ON | ON | OFF |
| DISABLE TO EDIT | OFF | ON | OFF |
| DISABLE TO PRINT | OFF | OFF | OFF |
| DISABLE TO COPY A CONTENT | OFF | ON | OFF |

| SECURITY | COUPLED FILE |
|---|---|
| TYPING IN PASSWORDS WHEN OPENING A FILE | ON |
| DISABLE TO EDIT | ON |
| DISABLE TO PRINT | OFF |
| DISABLE TO COPY A CONTENT | ON |

FILE PROCESSOR, METHOD OF PROCESSING FILES, AND PROGRAM FOR PROCESSING FILES

This application is based on an application No. 2005-249316 filed in Japan, the contents of which are hereby incorporated by reference.

BACKGROUND OF THE INVENTION

1. Field of the Invention

The present invention relates to a file processor, and more particularly to a file processor which couples a number of electronic files including a file with settings related to security to create one electronic file.

2. Related Art

When coupling a plurality of electronic files to create newly one file, an operator needs to cancel or invalidate several types of file management information which is set to each of the plurality of files to be coupled individually, so far.

The file management information includes security setting information. The security setting information contains information about security settings for limiting users who can modify, browse, print, etc. a file. When coupling files with effective security settings to create a new file, the operator has to cancel or invalidate the effective security settings once, and then add the plural files to one file to be newly created, and set manually the security settings which have been cancelled just before to the newly created coupled file.

As just described, the operator is obliged to cancel or invalidate manually the security settings and the like having been set to the files. Such operation can be a problem from the viewpoint of security management.

Furthermore, the operator's manual operation for resetting the security settings which once has been cancelled to the newly created coupled file raises concern about wrong operations.

JP-A-06-290214 discloses an apparatus for a filing system. This apparatus recognizes the existence of a number of files through an operator's registration operation. The apparatus can also set a "mutual connection relation" between the files designated by the operator, store the connection relation, and utilize the connection relation for file management. It is to be noted that the "connection relation" taught in JP-A-06-290214 is not an actual file coupling but a relationship which is based on the information stored separately. The information is used for managing individual files with a predefined relationship. Therefore, after giving the "connection relation", each file having the "connection relation" remains the same in the system. The system disclosed in JP-A-06-290214 does not perform a process for creating one file which includes the plurality of files.

The system disclosed in JP-A-06-290214 can set a password to multiple files which exist separately and are connected each other with one connection relation. In other words, the single password is set to multiple files.

JP-A-2002-019198 discloses an apparatus, which manages plural files combined as a group using a similar connection relation to that of JP-A-06-290214. The apparatus of JP-A-2002-019198 can optimize the settings for printing the plural files and perform a preferable print easily even when various and different settings for printing are set to the plural files.

SUMMARY OF THE INVENTION

However, the systems and apparatuses disclosed in above mentioned documents do not couple plural files together to create a new one file. Therefore, the system or apparatus cannot be applied to a process for coupling plural files together integrally to new one file.

The object of the present invention is to provide a file processor which can couple a plurality of files together to create new one file. The file processor according to the present invention can set security to the newly created coupled file easily, based on the security settings which have been set to each of the plurality of files.

To achieve the foregoing object, a first aspect of the present invention is a file processor which couples a plurality of files to create one coupled file including: a file selector that designates a plurality of files to be coupled; a security setting information extracting part that extracts security setting information which includes a setting item which is relevant to security being set to each of the files to be coupled; a coupled file creating part that couples the plurality of files to be coupled to create newly one coupled file; and, a security setup part that creates new security setting information based on the extracted security setting information and add new security setting to the coupled file based on the new security setting information.

Another aspect of the present invention is a file processing method for coupling a plurality of files to create one coupled file comprising: designating a plurality of files to be coupled; extracting security setting information from each of the files to be coupled, the security setting information including a setting item which is relevant to security being set to each of the files to be coupled; coupling the plurality of files to be coupled to create newly one coupled file; creating new security setting information based on the extracted security setting information; and, adding the new security setting based on the new security setting information to the coupled file.

Further aspect of the present invention is a computer program stored on a computer readable medium, which couples a plurality of files to create one coupled file comprising codes of: getting an operator to designate a plurality of files to be coupled by using an inputting part; extracting security setting information which includes a setting item which is relevant to security being set to each of the files to be coupled from the files to be coupled and storing the security setting information in a storage device; coupling the plurality of files to be coupled to create newly one coupled file and storing the coupled file in the storage device; creating new security setting information based on the extracted security setting information and storing the new security setting information in the storage device; adding the new security setting to the coupled file based on the new security setting information.

One of the advantages of the above described features is that, when coupling a plurality of files together to create new one file, an operator needs not to cancel security settings having been set to the files and reset the security settings to the new file manually. Hence, the above features make it easy for the operator to create the coupled file from secured files, saving the operator's workload, and preventing the operator's wrong operation.

BRIEF DESCRIPTION OF THE DRAWINGS

The above and further objects and novel features of the invention will more fully appear from the following detailed description when the same is read in connection with the accompanying drawings, and in which.

It is to be expressly understood, however, that the drawings are for the purpose of illustration only and are not intended as definitions of the limits of the invention.

DETAILED DESCRIPTION OF THE PREFERRED EMBODIMENTS

A preferred embodiment of the present invention and its modifications are described below in more detail referring to the accompanying drawings.

[System Configuration]

Figure 1:
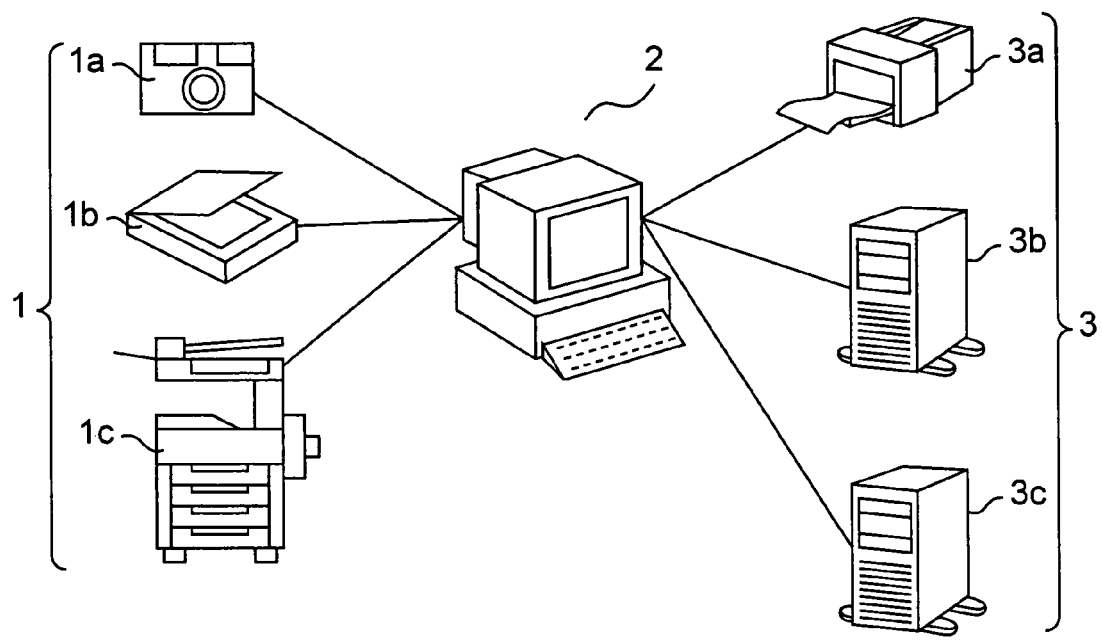
FIG. 1 is a schematic diagram of a file processing system including a file processor according to one embodiment of the present invention.

Referring to FIG. 1, a schematic diagram of a file processing system including a file processor will be described. File processing system 100 includes an input apparatus 1, a file processor 2, and an output apparatus 3. The input apparatus 1 may be connected to the file processor 2 such that the input apparatus 1 can transmit data to the file processor 2. The file processor 2 may be connected to the output apparatus 3 such that the file processor 2 can transmit data to the output apparatus 3. Preferably, the input apparatus 1 and the file processor 2 are connected by a bidirectional communication line, and the file processor 2 and the output apparatus 3 are also connected by a bidirectional communication line.

The input apparatus 1 can obtain an image inputted from outside or created in the system 100. For example, the input apparatus 1 is a digital camera 1a, a flatbed scanner 1b, a multifunction peripheral (MFP) 1c, or the like. In addition, the input apparatus 1 may be an information processor such as a personal computer, which is connected to the file processor 2 via a network etc. In this case, the input apparatus 1 may be connected to the file processor 2 such that a file stored in the information processor can be transmitted to the file processor 2.

The file processor 2 may be an information processor such as a personal computer. An operator can operate the file processor 2 by inputting means such as a mouse, a keyboard, or the like. Alternatively, the file processor 2 may be a multifunction peripheral (MFP) which has a storage device inside and has an operating unit as an inputting means being operable to input an instruction by the operator. The operating unit may be embodied as a touch-sensitive panel, for example. In this case, the file processing system 100 is configured by the MFP alone since the MFP has functionalities of the input apparatus 1, the file processor 2, and the output apparatus 3.

The output apparatus 3 is an apparatus which can output the data received from the file processor 2 to the outside of the system electronically or to a medium such as a paper or the like. The output apparatus 3 may be a printer 3a, a file transfer protocol server (FTP server) 3b, a mail server 3c, or the like, for example. As mentioned above, an MFP can also be used as the output apparatus 3. Moreover, an FTP server 3b or a mail server 3c can also be used as the input apparatus 1 since these servers 3b and 3c both can receive electronic data from outside the system 100 and transmit them to the file processor 2.

[Configuration of File Processor 2]

Figure 2:
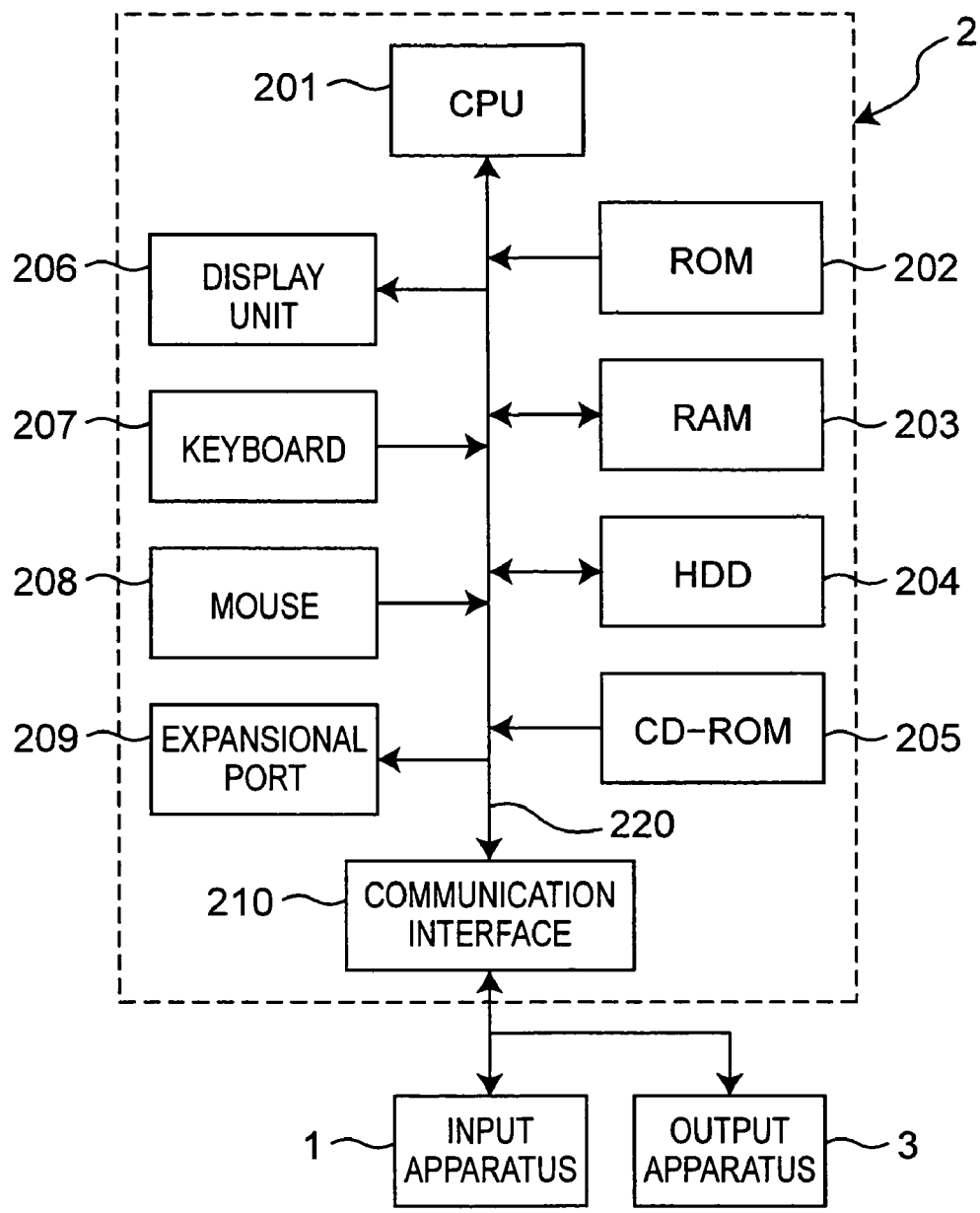
FIG. 2 is a block diagram of the file processor according to the embodiment.

Referring to FIG. 2, a block diagram of the file processor 2 will be described, next. The file processor 2 has a central processing unit 201 (hereinafter, referred to as CPU). The CPU 201 is connected to a data bus 220. Via the data bus 220, the CPU 201 is connected to a read-only memory 202 (hereinafter, referred to as ROM) which is used for storing control programs of the file processor 2 and the like, a random-access memory 203 (hereinafter, referred to as RAM) which is used for storing various types of data, files, and programs, a hard disc drive 204 (hereinafter, referred to as HDD), a compact disc read only memory (hereinafter, referred to as CD-ROM) drive 205 for receiving a CD-ROM, a display device 206 which displays an image, a character, or the like, a keyboard 207 and a mouse 208 which are used for inputting information, an expansional port 209, and a communication interface 210 (hereinafter, referred to as I/F) which is used for connecting the file apparatus 2 to the input apparatus 1 and to the output apparatus 3. By means of these components, a program stored in the storage device 202, 203, and/or 204, and the CPU 201 which executes the program, the file processor 2 implements functions of: designating a plurality of files to be coupled; extracting or checking out information about the security setting being set to the files to be coupled; displaying a list of the extracted security setting information; receiving information inputted to the file processor 2 by an operator; canceling the security setting being set to the file to be coupled; newly creating a coupled file; setting the security setting to the coupled file; and selecting a security setting item to be set to the coupled file by the operator.

It is to be noted that the CPU 201 may be a commonly distributed processor such as Pentium (registered trademark) of Intel Corporation.

Processes performed by the file processor 2 according to the present embodiment are described next.

[An Illustrative and Explanatory Example of the File Processing Program]

Figure 3A:
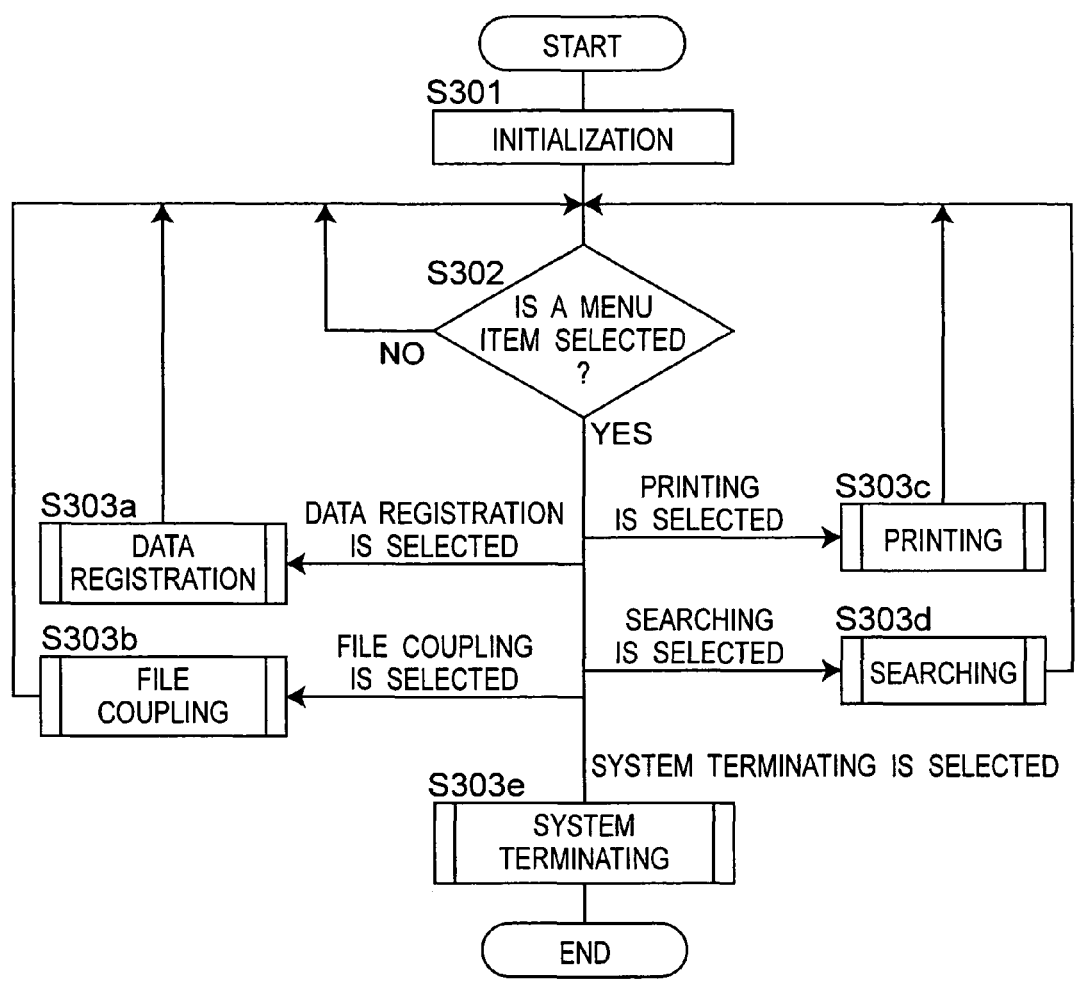
FIG. 3A is a flowchart of a file processing program according to the embodiment.

Referring to FIG. 3A, a flowchart of the main routine of the program of the file processing program will be described. This program can be stored in the ROM 202, RAM 203, HDD 204, or CD-ROM loaded in the CD-ROM drive 205 and be executed by the CPU 201 of the file processor 2.

When the file processing program is launched, the program performs step S301 first, which is a step for initialization. At step S301, the program performs an initialization of flags and the like necessary for following processes and displays an initial screen and the like.

Next, the program performs step S302, which is a step for waiting an input of a selection from a menu by an operator. The program waits the operator's selection at S302 till the operator selects a menu item. The operator selecting a menu item, the program selectively executes one of the steps S303a, S303b, S303c, S303d, or S303e, each of which is a step for performing particular processes, based on the selection.

Figure 3B:
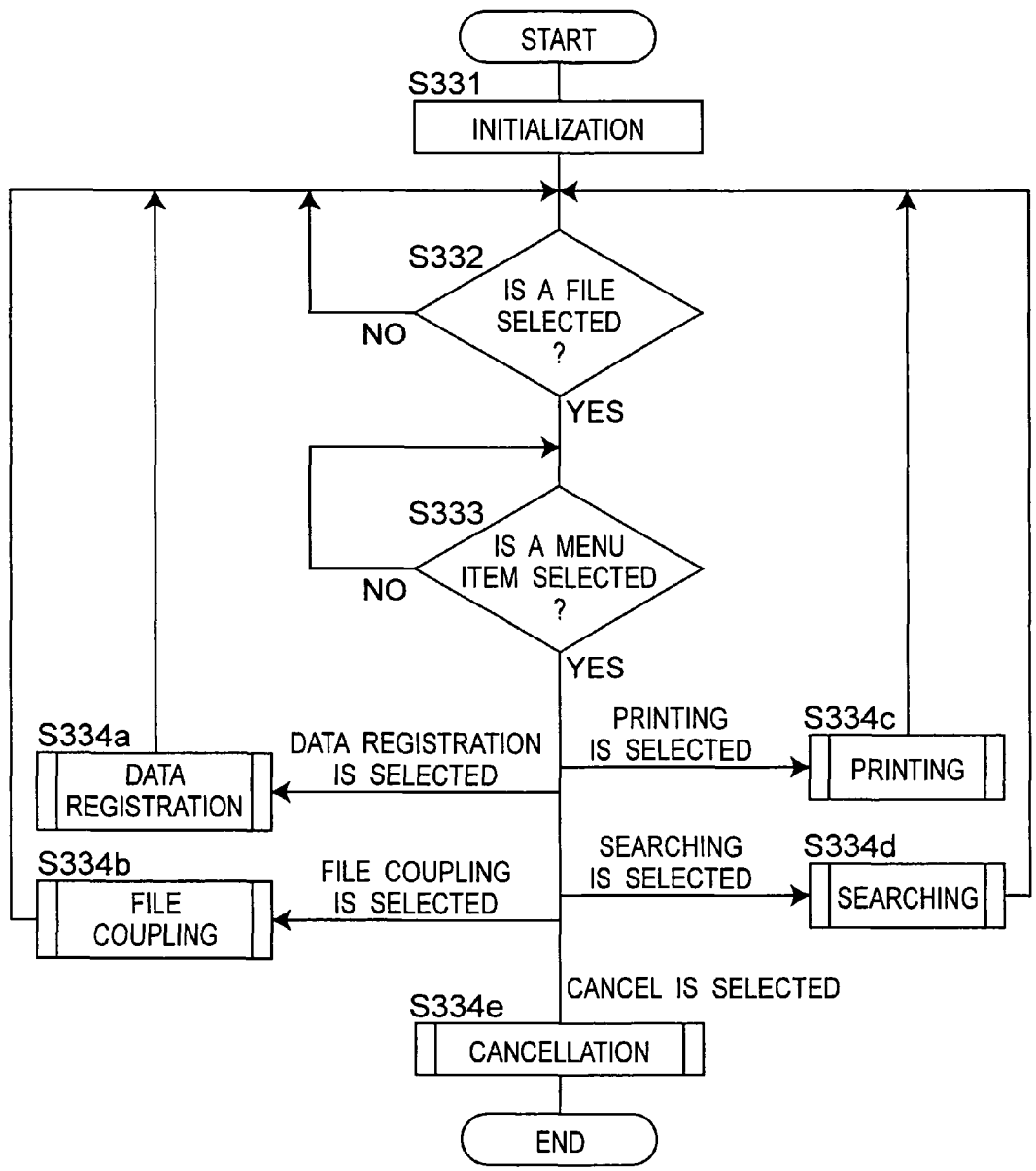
FIG. 3B is another example of the flowchart of the file processing program according to the embodiment.

On the other hand, referring to FIG. 3B, a flowchart of an example of a modified main routine of the program of the file processing program is shown. This program can also be stored in the ROM 202, RAM 203, HDD 204, or CD-ROM in the CD-ROM drive 205 and be executed by the CPU 201.

The program shown as the flowchart in FIG. 3B is different from that shown as the flowchart in FIG. 3A in that step S332, which is a step for detecting a selection by the operator, is disposed in just front of step S333 corresponding to the step S302 in FIG. 3A. When the operator selects one or more files (by clicking one or more files with mouse 208, for example), a menu of operations which can be performed on the one or more selected files is screened on display device 206. The example of modification is constructed such that an operator's desiring operation can be performed by the operator's selection of the operation from the menu for the selected file. In addition, the step S333 can be cancelled by clicking on "cancel" of the menu or somewhere in the screen except the menu, for example.

The items of the menu, which are selectable operations by the operator at step S302, are listed below by way of example.

"Data Registration" (step S303a)

At data registration step S303a, file processor 2 receives data from the input apparatus 1 and conducts a process for getting the input data to be under management of the file processor 2 as a file. In practice, in case that the input apparatus 1 is a digital camera 1a, the file processor 2 performs processes for transferring one or more image data stored in the digital camera 1a to a storage device 203 or 204 of the file processor 2 as a file or files at the step S303a. Alternatively, in case that the input apparatus 1 is an MFP 1c, the step S303a includes processes not only for transferring a data from the MFP 1c to the file processor 2 but also for sending an instructions to the MFP 1c for scanning an image on a paper medium such as a manuscript or the like to create a digitalized data of the image and transferring the digitalized data to the file processor 2. In short, the Data Registration is processes for importing a data from the input apparatus 1 to the file processor 2 and recognizing the imported data as a file or files.

"File Coupling" (step S303b)

At file coupling step S303b, the file processor 2 performs a process for coupling a plurality of files selected by the operator from files registered in the file processor 2 to create a new file.

"Printing" (step S303c)

At printing step S303c, file processor 2 prints one or more files selected by the operator from the registered files with a printing apparatus. The printing apparatus, which performs printing at step S303c, may be involved in the output apparatus 3.

"Searching" (step S303d)

At searching step S303d, file processor 2 searches for and retrieves one or more files among the registered files using keywords, markers, or the like associated with each registered file.

"System Terminating" (step S303e)

At system terminating step S303e, file processor 2 performs processes for terminating the program, which may include any process required for this termination.

Furthermore, the system 100 can also provide other file processing menu than those listed above.

Further description for the menu items "Printing" (step S303c) and "Searching" (step S303d) are abbreviated since these processes are comprised of commonly used processes.

The file coupling process (step S303b) is described in detail below.

Figure 4:
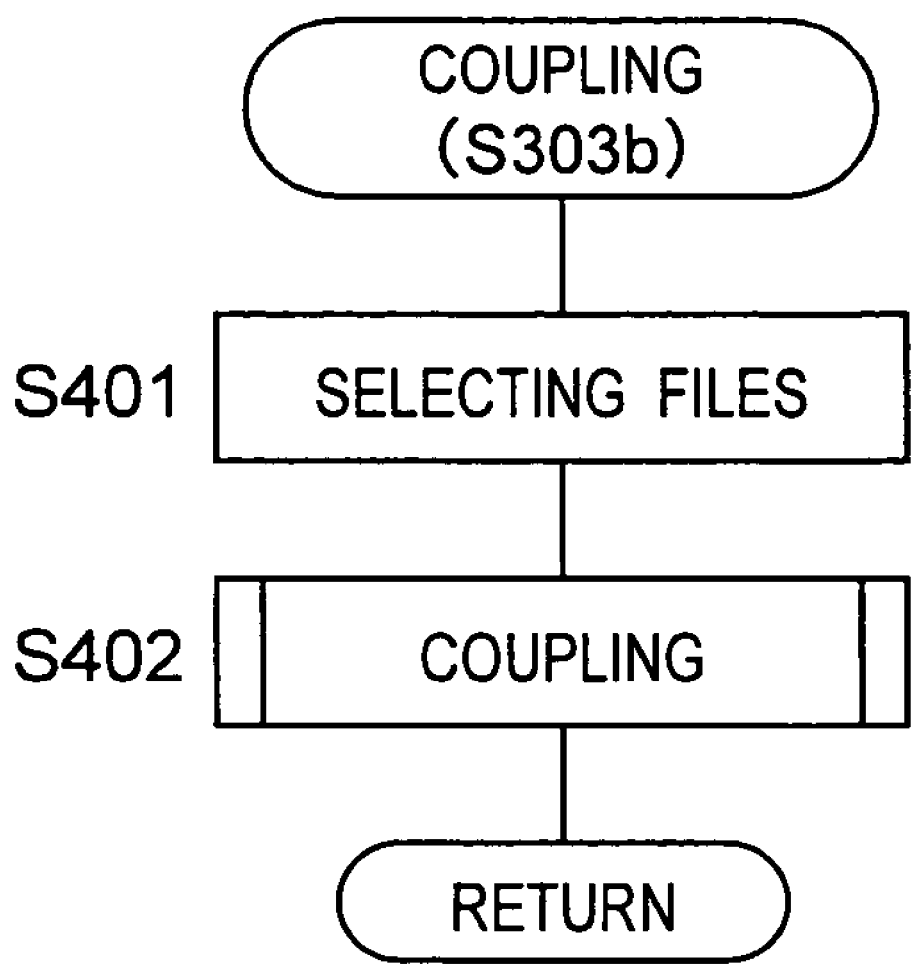
FIG. 4 is a flowchart of steps for file coupling operations.

FIG. 4 is a detailed flowchart of the file coupling processes (step S303b of FIG. 3A or step S334b of FIG. 3B).

When the operator selects "File Coupling" from the menu using an inputting device such as a keyboard 207 or a mouse 208, the program displays a screen on which the program prompts the operator to select a plurality of files to be coupled. The program waits until the selection by the operator completes (step S401). Step S401 can be omitted in case that the program is constructed as the flowchart of FIG. 3B and a plurality of files can be selected at step S332 since the files are already selected. As a matter of course, in just above mentioned case, step S401 can be provided to select additionally one or more files. In case that only one file has been selected at step S332, the step S401 is especially indispensable.

Whereupon the operator completes the selection of files, the program proceeds to file coupling step S402.

Figure 5:
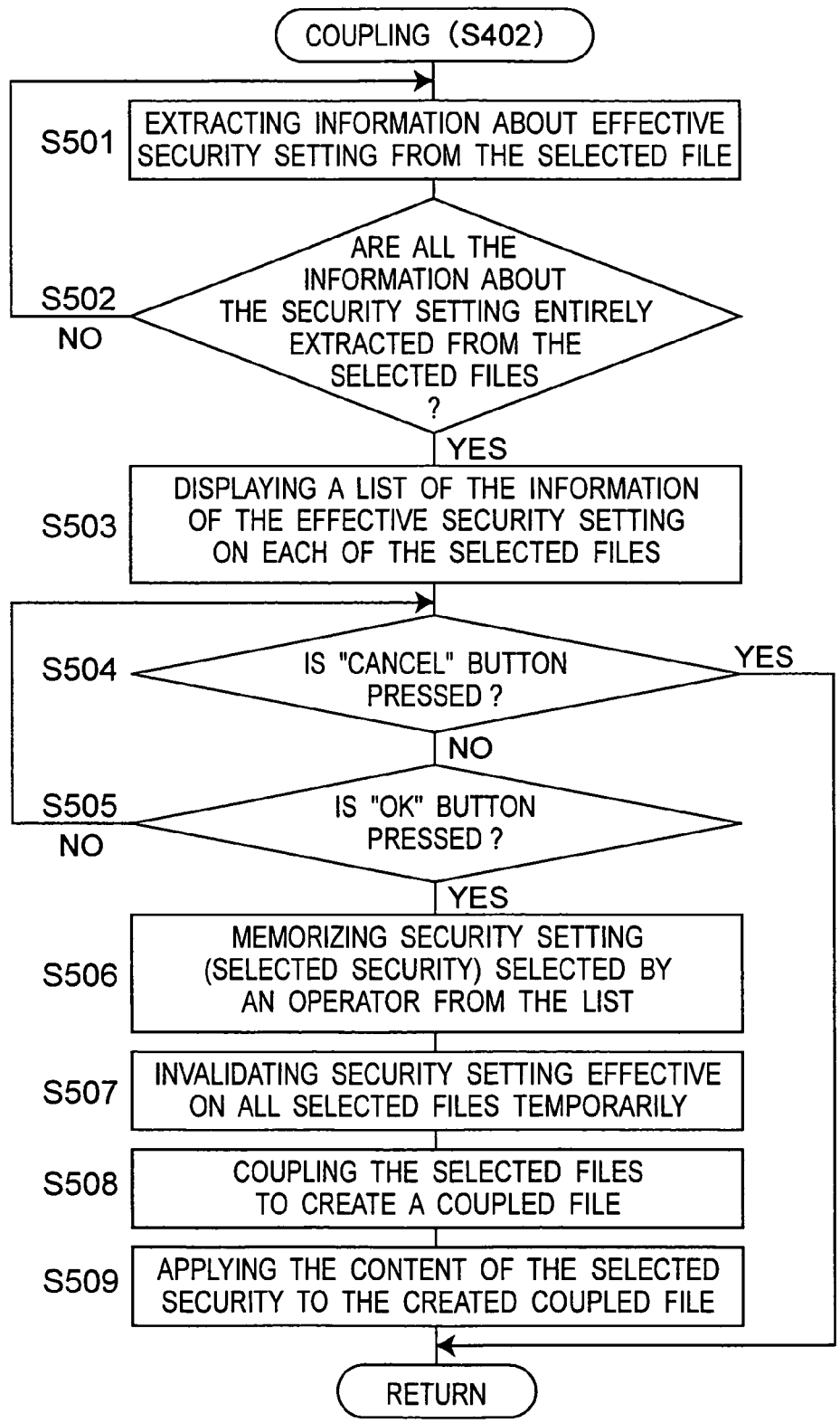
FIG. 5 is a detailed flowchart of steps for file coupling.

With reference to FIG. 5, the detail of the file coupling step S402 is described. FIG. 5 is a detailed flowchart of the file coupling step S402 of FIG. 4.

First, the file processor 2 checks security settings of each one of the selected files (step S501). More clearly, the file processor 2 checks (extracts) the security setting parameters being set to each selected file about the following items.

(1) An object ("Security setting object") to which the security setting is set.

(2) A system ("Securing system") by which the security setting object is secured.

The "Security setting object" of (1) is an object (or a process) to which a permission/refusal is set. The security setting object represents a certain process (or an object) of which securities are controlled including access permission, print permission, read-only-access permission, editing permission or the like. In addition, the security setting object may include a setting for permission/refusal to a specific and discrete process concerning printing or accessing. The "print permission" may include a permission to print with watermarks, a permission to print with low resolution only, and the like, for example. Moreover, the "access permission" may include not only a setting of permission/refusal to an access, but also a setting of permission/refusal to a "read-only-access", a setting of permission/refusal to an "operation for editing a file", and the like, for example. The setting of permission/refusal to an "operation for editing a file" may include a setting of permission/refusal to an operation for deleting a page, inserting a page, adding a comment, rotating a page, deleting a letter, inserting a letter, adding a stamp, deleting a stamp, adding a header/footer, deleting a header/footer, and the like, for example.

The "Securing system" of (2) is a system or a method for authentication. The securing system includes a password system, a cipher system (a cryptosystem), biometric authentication (biometrics), user profile authentication, or the like, for example. In addition, the password system may include a system requiring an input of not only a password but also a user's profile (such as user's birthday, address, telephone number, etc.). At step S501, the program also checks the reliability for authentication of the securing system such as a number of digits of a password etc. when the securing system is the password system. Alternatively, at step S501, when the securing system is the cipher system (cryptosystem), the program also checks the type of the cryptosystem (symmetric key cryptosystem, asymmetric key cryptosystem, etc.), the type of encryption system (such as the data encryption standard (DES), triple DES, Rivest-Shamir-Adleman (RSA) cryptosystem, etc.) and its version, and strength of encryption (cipher strength). Alternatively, at step S501, the program also checks the type of the biometric information used for the authentication (such as a fingerprint, a palm print, a voiceprint, an iris pattern, etc) when the securing system is the biometric authentication.

The results of these checks are stored in the storage device 203 or 204 of the file processor 2.

At step S502, the program checks whether all the selected files are checked and are entirely extracted and stored in the storage device 203 or 204 of the file processor 2 or not. As a result of the check, if a file which has not been checked yet exists, the program goes back to the step S501. If all the selected files have already been checked, the program proceeds to step S503.

Figure 6A:
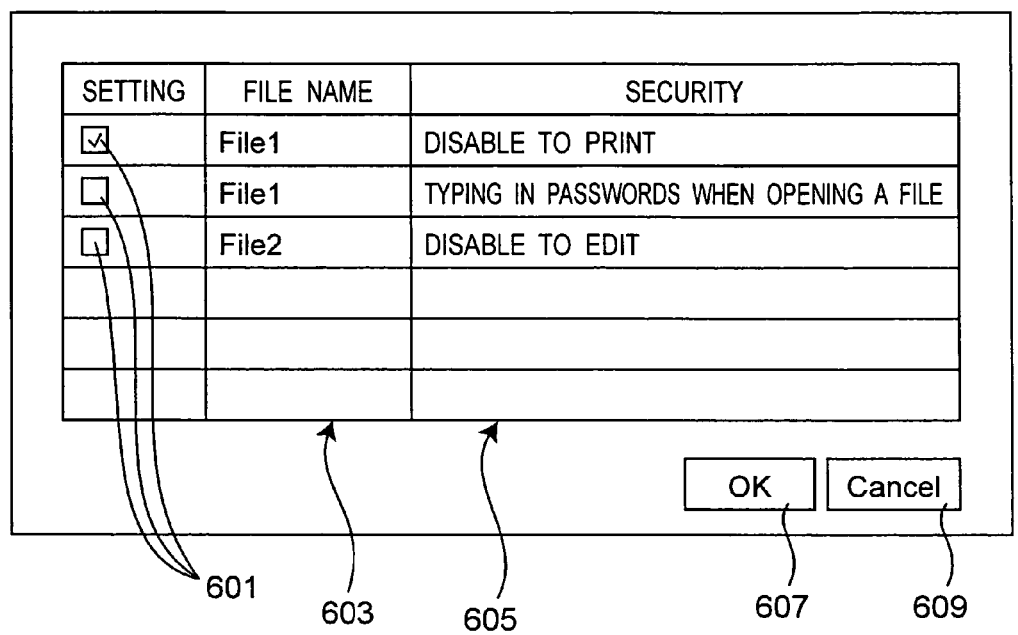
FIG. 6A is a schematic diagram of a display screen for selecting a security setting object.
Figure 6B:
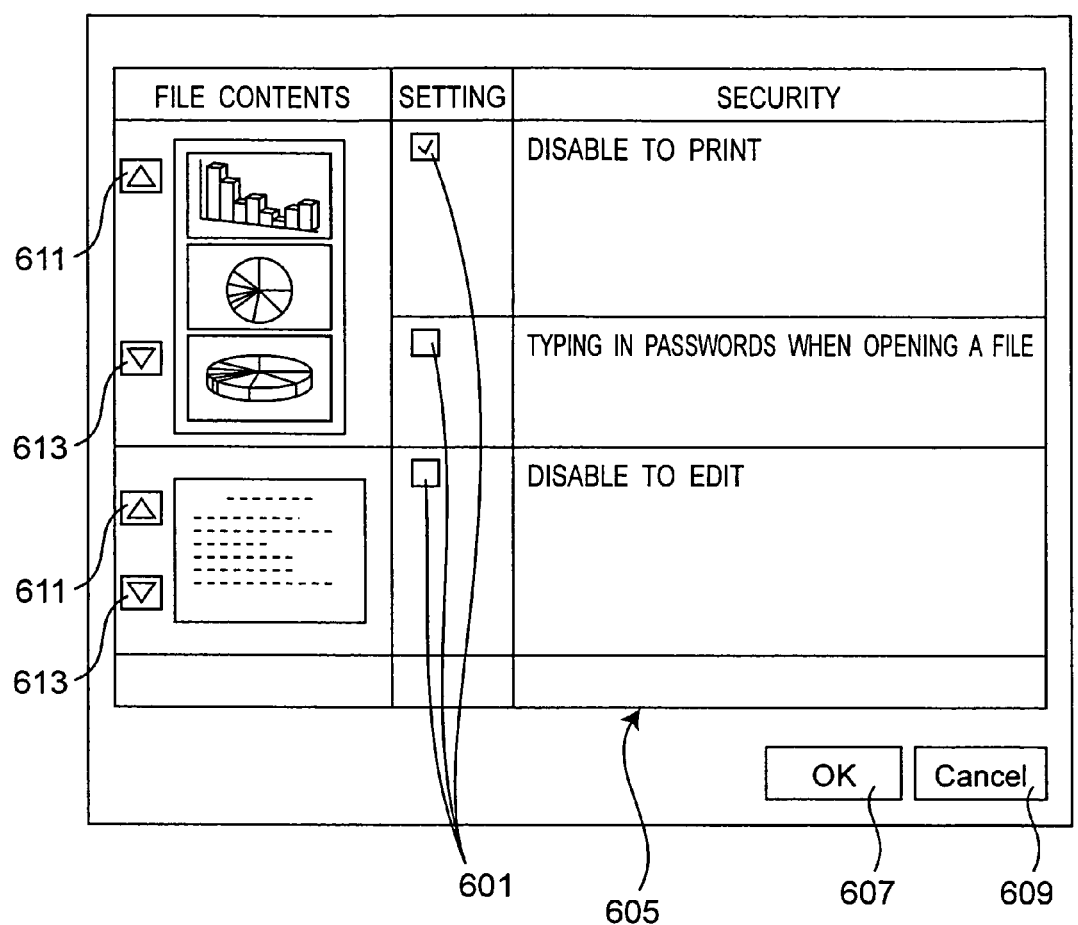
FIG. 6B is a schematic diagram of another example of the display screen for selecting the security setting object.

At step S503, the program displays the security settings of the selected files which has been checked and stored at step S501 on display device 206 to show the operator information about the security settings. FIGS. 6A and 6B are illustrative diagrams of screens at step S503. FIG. 6A is one example of the display screen, wherein file names of the selected files and security setting objects set thereto are listed in a table with letters. FIG. 6B is another example of the display screen, wherein a column for graphical representations of the contents of the selected files is provided instead of the column indicating the file names with letters. In both tables in FIGS. 6A and 6B, one or more check boxes 601 are disposed for each file. The operator can select one or more items of the security setting objects which the operator intends to set to the coupled file, based on the information indicated in the file name column 603 and the security setting object column 605. Hereinafter, the security setting objects which the operator intends to set to the coupled file are referred to as "selected security setting object(s)." A number of check boxes can be disposed for one selected file to which several different security setting objects are set. The selection of the security setting object may be done by checking its check box using the keyboard 207 or mouse 208. The checking changes the status of the check box from ON to OFF or from OFF to ON alternately. If plural check boxes are turned ON, the security setting object of the coupled file is to have complex security setting with plural security setting objects. On the other hand, if all the check boxes are turned OFF, no security setting is to be set to the coupled file at all. In the example shown in FIG. 6B, a column indicating the contents of the selected files is provided graphically instead of the column indicating the file names of the selected files. In addition, buttons for turning a page backward and forward 611 and 613 are disposed at the side of thumbnail images of the files. The operator can view the content of each page of the file by handling the button 611 or 613 using the keyboard 207 or mouse 208. After checking check boxes 601 of the security setting objects which the operator intends to set to the coupled file, the operator clicks "OK" button 607. Alternatively, if the operator clicks "CANCEL" button 609, the program returns to the menu item selecting step S302 (see FIG. 3A) or the file selecting step S332 (see FIG. 3B).

As mentioned above, since the program displays the list of the security setting objects on the display device 206, the operator can select a security setting object quite easily from the list. Therefore, a wrong operation by the operator can be avoided.

If the operator clicks the "OK" button (YES in step S505), the program proceeds to step S506.

It is to be noted that an interface for determining the selected security setting objects is not limited to the interfaces shown in FIGS. 6A and 6B. For example, the security setting object may be selected by clicking a part of a row which displays the security setting object to be selected in place of check boxes.

At step S506, information on the security setting object selected by the operator (selected security setting object) is stored in the storage device 203 or 204 as selected security setting object data and then the program proceeds to step S507.

At step S507, effective security settings in all selected files are invalidated temporarily.

Then, at step S508, the coupled file which is constructed from the selected files is created newly.

Next, at step S509, security is set to the newly created coupled file based on the selected security setting object data stored previously at the step S506.

The program is configured as above, so that the operator can couple plural files to create a new coupled file without remembering security settings being set to the files to be coupled and setting the security settings to the newly created coupled file.

In addition, the operator does not have to cancel the security settings being set to the original files to be coupled manually. Indeed, it may be a problem to cancel the security from a view point of security management even though the cancellation is a transitional and temporal procedure. The operator who is obliged to operate such procedure may sometimes bear a psychological burden. The above described procedure diminishes such psychological burden and risks of operational mistakes by the operator. A series of operations including the temporal cancellation of the security are started only after the selection of the security setting object which is to be applied to the coupled file has completed. Hence, there is no fear that the state where the security setting is cancelled would hold on so that the security for the selected files can be improved. However, when the operator turns all the check boxes to OFF at step S503, the process of step S506 may be started. More preferably, countermeasures for above mentioned case such as issuing a warning prompting the operator to select a security setting object, inhibiting the process of step S506 while no check box is turned to ON, or the like may be taken. By one of such countermeasures, the procedure for setting security to the coupled file is even further assured.

[An Example of a Modification to the File Processing Program]

Figure 7:
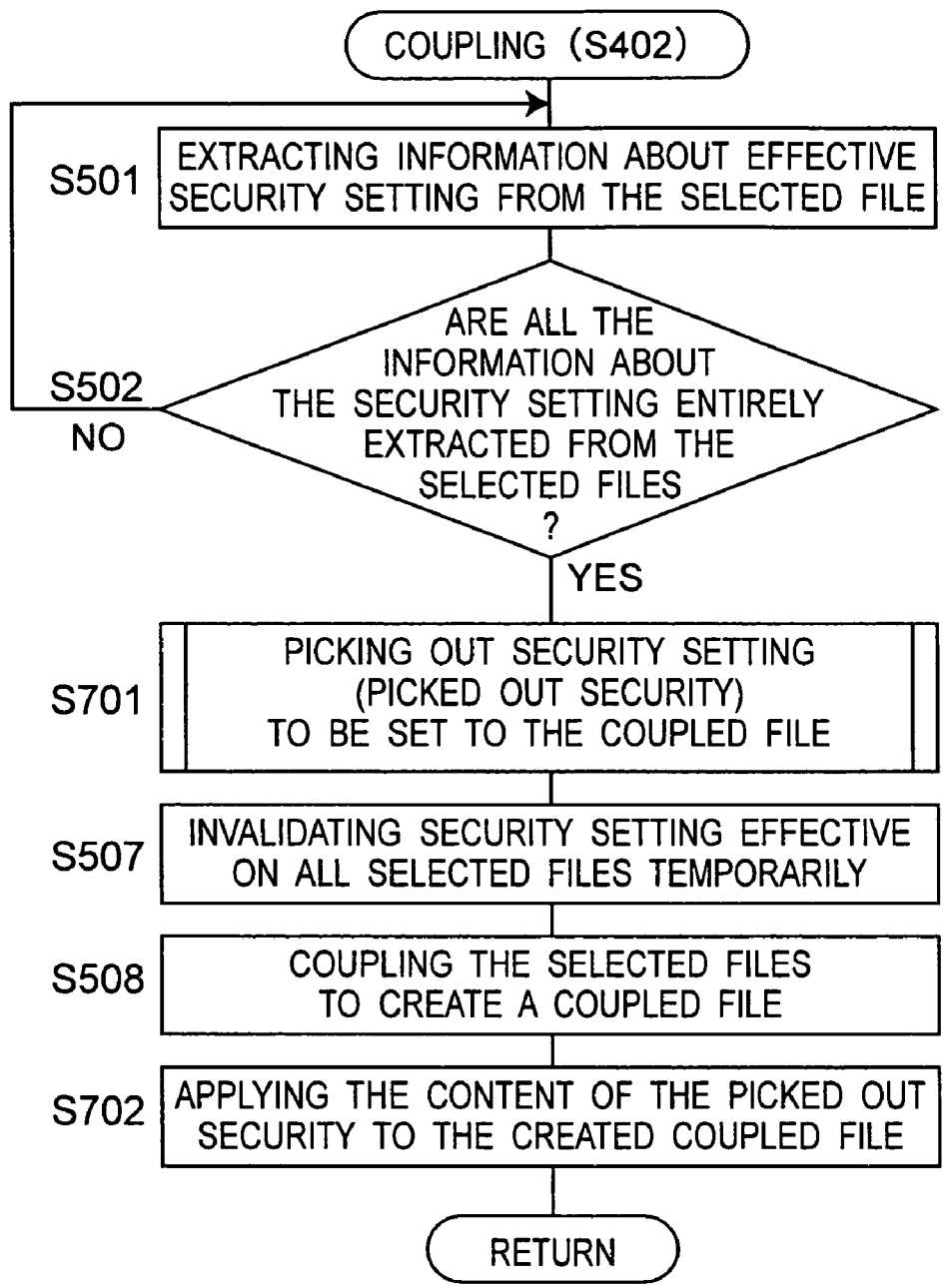
FIG. 7 is another example of the flowchart of the steps for file coupling.

Referring to FIG. 7, a modification of the flowchart of the coupling step S402 shown in FIG. 4 will be described.

In the present modification, steps S501, S502, S507, and S508 are substantially same as those shown in FIG. 5, the description for those steps are abbreviated.

At step S701, this program automatically picks out (selects) security setting objects which are to be set to a newly created coupled file. Those security setting objects, which are automatically picked out as the security setting objects to be set to the coupled file by the program, are referred to as "picked out security setting objects" hereinafter. The present modification differs from the above mentioned embodiment in that the program automatically picks out the security setting objects which are to be set to the coupled file.

Figure 8:
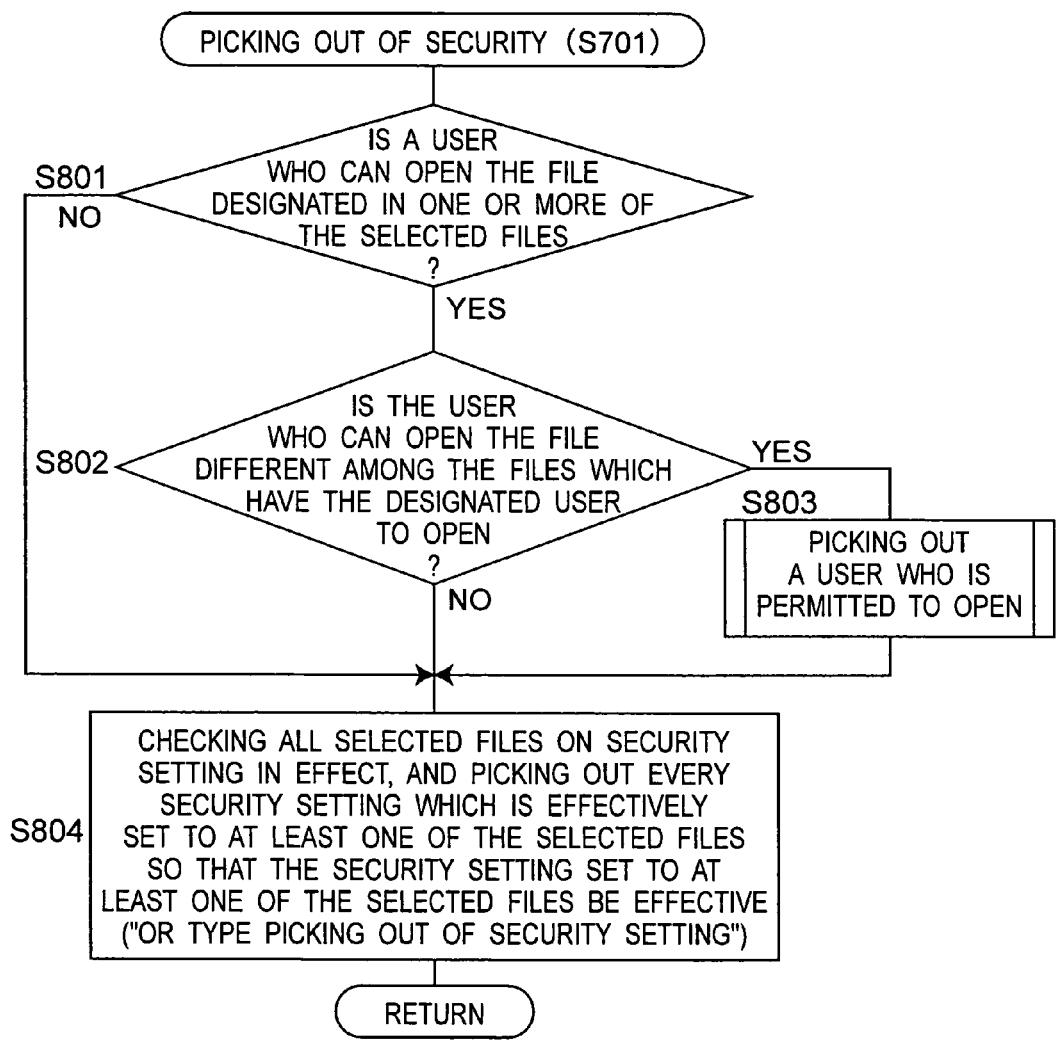
FIG. 8 is a flowchart of steps for picking out securing system.

FIG. 8 is a detailed flowchart of the processes for picking out the security at the step S701.

At step S801, all the selected files are checked if the selected files include at least one file which is limited to open (access) to a particular user or users. When there exists no file which is limited to open to a particular user or users (NO in the step S801), the program proceeds to step S804. Alternatively, when there exists at least one file which is limited to access to a particular user or users (YES in the step S801), the program proceeds to step S802.

At step S802, it is checked whether the users who are authorized to access each file are same or not. In the check of this step, a file which access permission is not assigned to a particular user may be cognized as a file which access permission is assigned to every user. If all files have the same authorized users (NO in the step S802), the program proceeds to step S804. Alternatively, if at least one of the files has different authorized user(s) than another (YES in step S802), the program proceeds to step S803.

A process of access authorized user picking out step S803 is described in detail later.

At step S804, all selected files are checked on security setting objects in effect. Every security setting object which is effectively set to at least one of the files is picked out so that every one of the picked out security setting objects is set in effect to the coupled file. In other words, the security setting objects which are to be set to the coupled file is picked out by adding all effective security setting objects of each file. That is, security setting items are picked out by logical sum ("OR") operation. The security setting objects picked out in above mentioned manner are referred to as "OR type picked out security setting objects" hereinafter.

The OR type picked out security setting objects involves all security setting objects which are set to the selected files. Therefore, the security to be set to the coupled file is equal to or stronger than any settings set to the selected files.

Figure 9:
FIG. 9 is a schematic diagram on the securing system picking out.

FIG. 9 illustrates the picking out of security setting objects for the coupled file in above mentioned OR type manner. In the figure, the column "SECURITY" indicates security setting object which may be set to at least one of the selected files (FILE 1, FILE 2, and FILE 3). For example, "TYPING IN PASSWORDS WHEN OPENING A FILE" means that the security setting object which limits an access to open a file with password authentication system as a securing system is set to FILE 1 and FILE 2. "DISABLE TO EDIT" means that the security setting object which limits editing to the file is set to FILE 3. Meanwhile it is shown that "DISABLE TO PRINT" is not set to the selected files. "DISABLE TO COPY" means that the security setting object which limits copying whole or a part of a file is set to FILE 2.

In this case, all security setting objects except for "DISABLE TO COPY" are picked out in the OR type picking manner to set them to the coupled file.

Alternatively, though not shown in the figure, security setting objects for the coupled file may be picked out such that only the security setting objects which are commonly set to the every selected file are set to the coupled file, at step S804. In other words, the security setting objects to be set to the coupled file may be picked out by "AND" operation from security setting objects of each file. The security setting objects picked out in this manner are referred to as "AND type picked out security setting objects" hereinafter.

The AND type picked out security setting objects involves the security setting object(s) which are commonly set to every one of the selected files. As a consequence, the security setting to the coupled file is arranged only with bare essentials of the security setting objects. Therefore, when accessing the coupled file, an authentication procedure is minimized.

Figure 10:
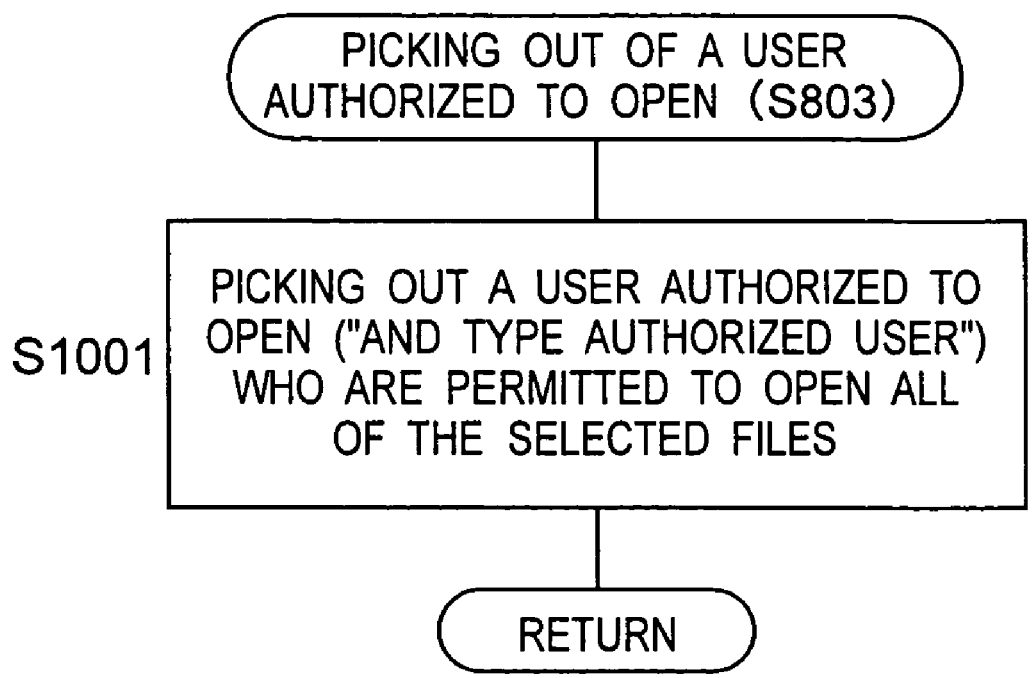
FIG. 10 is a flowchart of picking out an authorized user.
Figure 11:
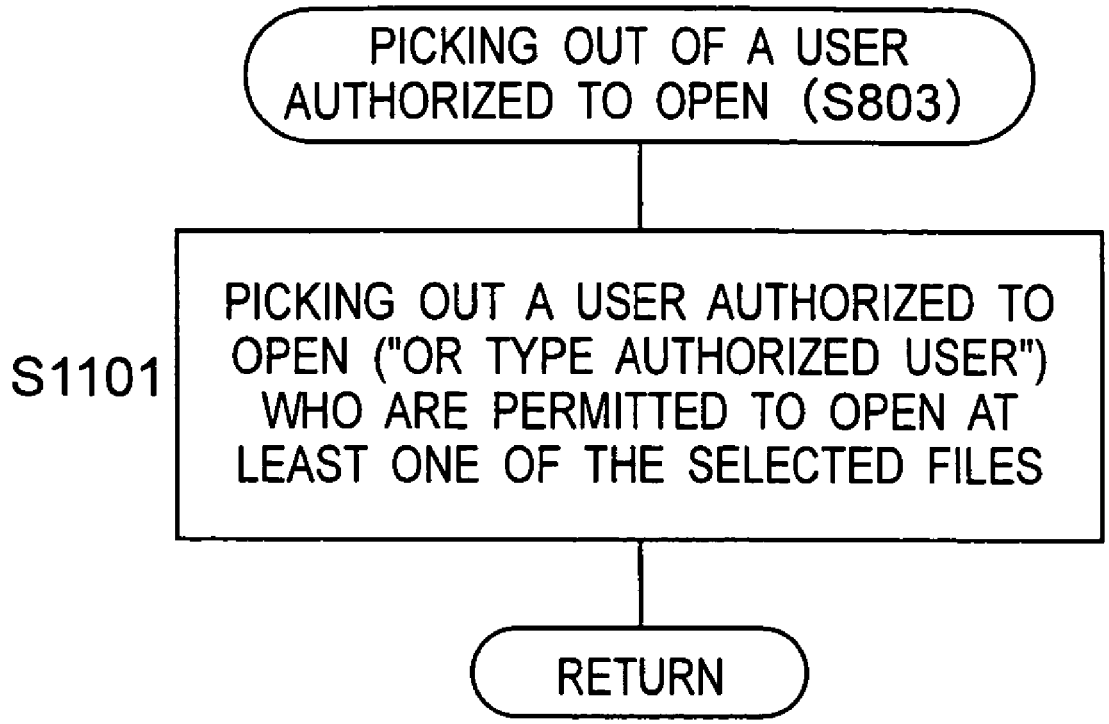
FIG. 11 is another example of the flowchart of the picking out an authorized user.

FIGS. 10 and 11 are detailed flowcharts of processes in step S803.

FIG. 10 is an exemplary configuration of step S803. At step S1001, applying "AND" operation to users who are permitted to access to (open) each one of the selected files, the users who are commonly authorized to all selected files are picked out, and designated as users who can access the coupled file. User picking procedure of this type is referred to as "AND type authorized users" picking hereinafter.

This "AND type authorized users" picking is favorable in the view point of strength of security of the coupled file, but users authorized to access may be extremely limited. The following "OR type authorized users" picking is not better than the "AND type authorized users" picking in strength of security, but it can provide the coupled file with enough security level for actual use.

FIG. 11 is another example of step S803, which describes the OR type authorized users picking. At step S1101, applying "OR" operation to users who are permitted to access each one of the selected files, the users who are authorized to access at least one of the selected files are picked out, and designated as users who are authorized to access the coupled file. User picking procedure of this type is referred to as "OR" type authorized users picking hereinafter.

The file processing program may use the "AND type authorized users" picking procedure or "OR type authorized users" picking procedure. Furthermore the program can switch the type of user picking procedure between the "AND type" and the "OR type" according to the situation. Moreover, the program can also use any one of the two user picking procedures with above mentioned AND type security setting objects picking procedure or OR type security setting objects picking procedure.

At step S702, based on the picked out security, the security is set to newly created coupled file.

[Picking Out of the Securing System]

Thereinbefore, it is described how to inherit the security setting objects from the selected files to the coupled file. Next, it is described how a securing method (securing system) for the security setting objects is selected.

Different securing systems may be adopted for the identical security setting objects among the selected files (files to be coupled). Different securing systems may be adopted for different security setting objects among the selected files. Here, it will be described how the program picks out the securing system for the coupled file in such cases.

In general, various types of securing system can be used for user authentication. In addition, in the view point of the strength of security, there exist relative merits or demerits among the same kind of the securing systems.

Generally, the biometric authentication is stronger than the password authentication in strength of security, for example. The password authentication becomes stronger and more advantageous as the number of digits of its password increases in security, for example. Similarly, the triple DES cryptosystem is more advantageous than the DES cryptosystem in the security strength.

Therefore, when several securing systems each of which is different from each other in security strength are set to the original files, the program according to the present embodiment can pick out one securing system so that the strength of security of the coupled file become stronger.

The information about relative strength among securing systems of different type can be stored in storage devices 202, 203, and 204, and CD-ROM loaded in the CD-ROM drive 205 in advance. The information about relative strength between securing systems of same type can be stored in the storage devices 202, 203, and 204, and CD-ROM loaded in the CD-ROM drive 205, in advance.

Figure 12:
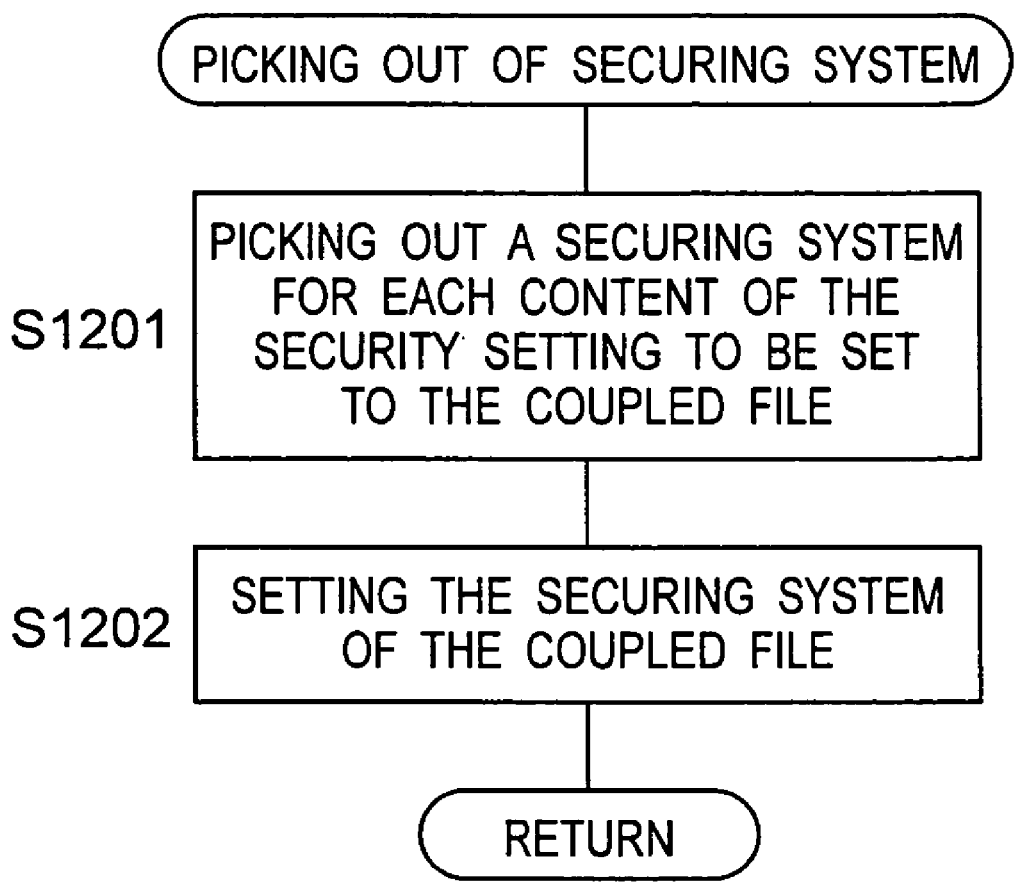
FIG. 12 is a flowchart of determination of securing system for a coupled file.

FIG. 12 is a flowchart including the processes for setting the securing system. Preferably, the steps of FIG. 12 are performed after step S508 shown in FIGS. 5 and 7.

At step S1201, a securing system for each security setting object of the coupled file is picked out from the securing systems set to the selected files by comparing the securing systems set to the selected files, so that the security strength of each of the security setting object of the coupled file be as strong as possible.

At step S1202, the securing system picked out at the last step is applied to the coupled file.

For example, when the selected files uses cryptosystems as securing systems and one of the selected file uses DES cryptosystem and another one of the selected files uses triple DES cryptosystem, the program may preferably apply the triple DES cryptosystem as the securing system of the coupled file since the triple DES cryptosystem is safer (stronger) than the DES cryptosystem.

In addition, when several different versions of one cryptosystem are used in the selected files, it is preferable that the later version of the cryptosystem may be applied to the coupled file.

Furthermore, when several different password systems, each of which requires password of different length from each other, are used in the selected files, it is preferable that the password system requiring longer password may be applied to the coupled file.

When the securing system which requires inputting a user profile together with passwords is used in one of the selected files and the securing system which requires inputting a password only are exist, it is preferable that the program may apply the former securing system to the coupled file by priority.

When password system is used in one of the selected files and a biometric authentication is used in another one of the selected files, it is preferable that the program may apply the biometric authentication to the coupled file.

When two or more of the selected files are secured by different passwords, it is preferable that the program may apply the password system which requires all passwords used in any one of the selected files to the coupled file so that the coupled file is secured by the multiplex password authentication system.

The biometric authentication includes various authentication systems such as a fingerprint authentication, a voiceprint authentication, a palm print authentication, etc. When the program recognizes relative merits among them from the view point of security strength, it is preferable that the program may apply the stronger biometric authentication system to the coupled file.

The term "authentication" in the present application includes a user (an operator) authentication. The authentication method (system) or means includes a password system. The password system includes a single-use password system (one-time password (OTP) system, dynamic password system), which is deemed to be safer than usual password systems. In addition, the authentication method (system) or means includes a cryptosystem. The cryptosystem includes a secret key cryptosystem, a public key cryptosystem, a zero knowledge interactive proof (ZKIP), an ID-Based cryptosystem which encrypts data using a name as a public key, or the like. The secret key cryptosystem includes Data Encryption Standard (DES), Triple Data Encryption Standard (Triple DES (3DES)), Advanced Encryption Standard (AES), International Data Encryption Algorithm (IDEA), Fast Data Encipherment Algorithm (FEAL), MISTY, or the like. The public key cryptosystem includes Rivest-Shamir-Adleman Scheme (RSA) or the like. The public key cryptosystem includes Rivest-Shamir-Adleman Scheme (RSA). Moreover, the authentication method (system) or means includes an authentication based on biometric information (biometric authentication). The biometric information used for this type of authentication includes a fingerprint, a finger shape, a palm print, a hand geometric pattern, a voiceprint, a vein pattern, an ear shape, a face pattern, a retina pattern, an iris pattern, and, a velocity, acceleration, or tool force (writing pressure) in writing one's signature (dynamic signature verification), and the like.

The processes for "coupling" plural files according to the present application means the processes for combining a number of files to each other to create new one file. The "coupling" processes according to the present application do not include the processes for establishing and recording the relationships between or among files.

The file processor and the file processing program above mentioned are useful for file processing since the file processor and the program reduce an operator's load when coupling plural files at least one of which is secured.

What is claimed is:

1. A file processor which couples a plurality of files to create one coupled file, comprising:
a file selector that designates a plurality of files to be coupled;
a security setting information extracting part that extracts from the plurality of files to be coupled security setting information which includes a security setting of each of the files to be coupled;
a display that displays a selectable list of multiple security settings of the extracted security setting information to an operator to allow the operator to select from the list one or more of the multiple security settings to be applied to the coupled file, each of the multiple security settings corresponding to a predefined security setting;
a coupled file creating part that couples the plurality of files to be coupled to create one newly coupled file;
a security setting selecting part by which the operator selects one or more of the displayed security settings to be applied to the coupled file from the selectable list of multiple security settings displayed on the display;
a security setting canceling part which automatically cancels the security setting set to each of the files to be coupled after selection of the security setting to be applied to the coupled file has been completed; and
a security setup part that creates new security setting information based on the extracted security setting information and which includes the one or more selected security settings, and adds a new security setting to the newly coupled file based on the new security setting information.

2. The file processor according to claim 1, wherein the security setup part creates the new security setting information so that a security setting of the new security setting information which corresponds to a setting of permission/refusal to a process to the coupled file includes the security setting selected by the operator using the security setting item selecting part.

3. The file processor according to claim 1, wherein the security setup part creates the new security setting information so that a security setting of the new security setting information which corresponds to a predefined security setting includes all security settings that have been set to at least one of the files to be coupled.

4. The file processor according to claim 1, wherein the security setup part creates the new security setting information so that a security setting of the new security setting information which corresponds to a predefined security setting includes only at least one security setting that has commonly been set to all of the files to be coupled.

5. The file processor according to claim 1, wherein, when the extracted security setting information includes a plurality of the security settings which correspond to user authentication methods, the security setup part compares the user authentication methods included in the plurality of the security settings, and creates the new security setting information so that a security setting of the new security setting information which corresponds to a user authentication method for a process to the coupled file include the strongest user authentication method in the extracted security setting information.

6. The file processor according to claim 1, wherein, when at least one of the files to be coupled has a security setting which corresponds to a designation of an accessible user, the security setup part creates the new security setting information so that an accessible user to the coupled file includes a user who is commonly designated as the accessible user in all of the security settings of all files to be coupled.

7. The file processor according to claim 1, wherein, when at least one of the files to be coupled has a security setting which corresponds to a designation of a accessible user, the security setup part creates the new security setting information so that an accessible user to the coupled file includes a user who is designated as the accessible user in at least one of the security settings of all files to be coupled.

8. A file processing method for coupling a plurality of files to create one coupled file, comprising:
designating a plurality of files to be coupled;
extracting security setting information from each of the files to be coupled, the security setting information including a security setting of each of the files to be coupled;
displaying a selectable list of multiple security settings of the extracted security setting information to an operator to allow the operator to select from the list one or more of the multiple security settings to be applied to the coupled file, each of the multiple security settings corresponding to a predefined security setting;
coupling the plurality of files to be coupled to create one newly coupled file;
enabling the operator to select one or more of the displayed security settings to be applied to the newly coupled file from the displayed selectable list of multiple security settings;
automatically canceling the security setting being set to each of the files to be coupled after selection of the security setting to be applied to the newly coupled file has been completed;
creating new security setting information based on the extracted security setting information and which includes the one or more selected security settings; and
adding the new security setting based on the new security setting information to the newly coupled file.

9. The method according to claim 8, wherein the creating the new security setting information creates the new security setting information so that a security setting of the new security setting information which corresponds to a predefined security setting includes all security settings that have been set to at least one of the files to be coupled.

10. The method according to claim 8, wherein the creating the new security setting information creates the new security setting information so that, when the extracted security setting information includes a plurality of the security settings which correspond to user authentication methods, a security setting of the new security setting information which corresponds to a user authentication method for a process to the coupled file include stronger user authentication method than another method included in the extracted security setting information based on a comparison of the user authentication methods included in the plurality of the security settings.

11. The method according to claim 8, wherein the creating the new security setting information creates the new security setting information so that, when at least one of the files to be coupled has a security setting which corresponds to a designation of an accessible user, the accessible user to the coupled file includes a user who is commonly designated as the accessible user in all of the security settings of all files to be coupled.

12. A computer program stored on a non-transitory computer readable medium, which couples a plurality of files to create one coupled file, the program comprising codes of:
getting an operator to designate a plurality of files to be coupled by using an inputting part;
extracting from the plurality of files to be coupled security setting information which includes a security setting of each of the files to be coupled and storing the security setting information in a storage device;
displaying a selectable list of multiple security settings of the extracted security setting information to the operator to allow the operator to select from the list one or more of the multiple security settings to be applied to the coupled file, each of multiple security settings corresponding to a predefined security setting;
coupling the plurality of files to be coupled to create one newly coupled file and storing the coupled file in the storage device;
enabling the operator to select one or more of the displayed security settings to be applied to the newly coupled file from the displayed selectable list of multiple security settings;
automatically canceling the security setting being set to each of the files to be coupled after selection of the security setting to be applied to the newly coupled file has been completed;
creating new security setting information based on the extracted security setting information and which includes the selected one or more security settings, and storing the new security setting information in the storage device; and
adding the new security setting to the newly coupled file based on the new security setting information.

13. The computer program stored on a non-transitory computer readable medium according to claim 12 wherein the code of creating the new security setting information creates the new security setting information so that a security setting of the new security setting information which corresponds to a predefined security setting includes all security settings that have been set to at least one of the files to be coupled and stores the new security setting information in the storage device.

14. The computer program stored on a non-transitory computer readable medium according to claim 12 wherein the code of creating the new security setting information creates the new security setting information so that, when the extracted security setting information includes a plurality of the security settings which correspond to user authentication methods, a security setting of the new security setting information which corresponds to a user authentication method for a process to the coupled file include stronger user authentication method than another method included in the extracted security setting information based on a comparison of the user authentication methods included in the plurality of the security settings and stores the new security setting information in the storage device.

15. The computer program stored on a non-transitory computer readable medium according to claim 12 wherein the code of creating the new security setting information creates the new security setting information so that, when at least one of the files to be coupled has a security setting which corresponds to a designation of an accessible user, the accessible user to the coupled file includes a user who is commonly designated as the accessible user in all of the security settings of all files to be coupled and stores the new security setting information in the storage device.

* * * * *